April 17, 1951 D. W. EPSTEIN 2,549,072
RECORDING APPARATUS FOR RADAR SYSTEMS
Filed Feb. 27, 1946 2 Sheets-Sheet 2
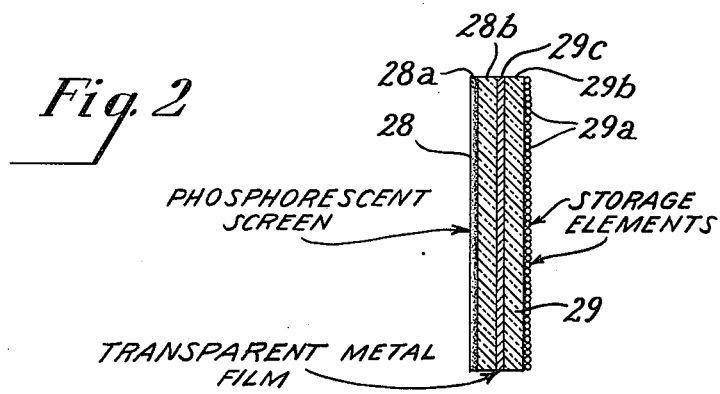
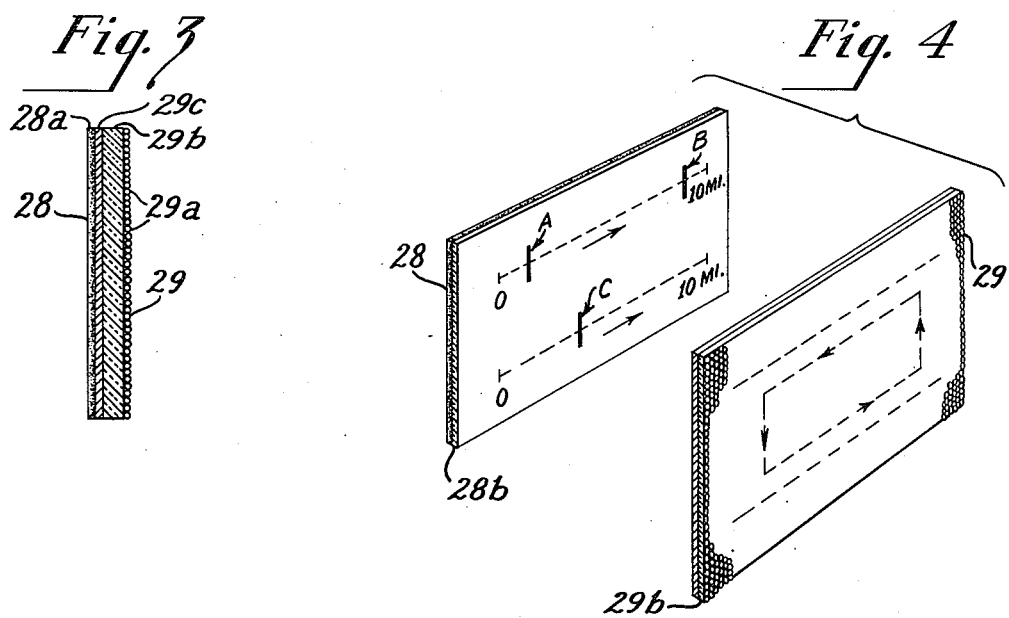
INVENTOR.
David W. Epstein
ATTORNEY Patented Apr. 17, 1951

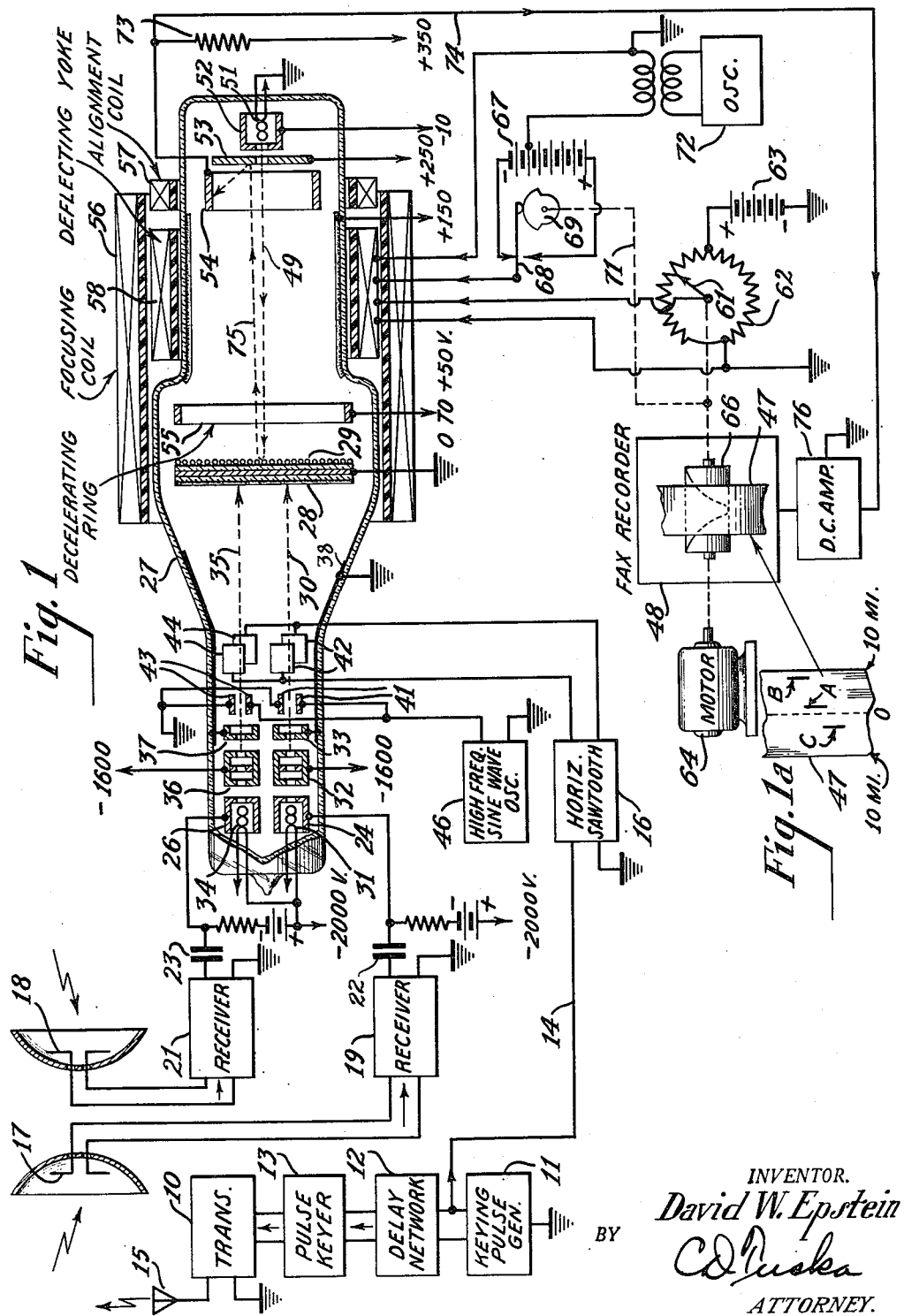

2,549,072

UNITED STATES PATENT OFFICE 2,549,072

RECORDING APPARATUS FOR RADAR SYSTEMS

David W. Epstein, Princeton, N. J., assignor to Radio Corporation of America, a corporation of Delaware Application February 27, 1946, Serial No. 650,708

3 Claims. (Cl. 250—150)

My invention relates to signal receiving systems wherein images produced on luminescent screens or the like are transferred to the storage screen of a cathode ray tube.

The present invention is particularly applicable to systems wherein a radar picture is produced on a luminescent screen and wherein it is desired to transmit the radar picture to a remote point by utilizing a cathode ray storage tube. It has previously been proposed to project such a radar picture upon a storage screen by means of a lens system. An arrangement of this kind is described and claimed in application Serial No. 500,739, filed August 30, 1943 in the name of Irving Wolff and entitled Recorder for Radio Locator now Patent No. 2,415,981 issued February 18, 1947. A serious disadvantage of the Wolff arrangement is that even with a good lens system a large amount of light is lost with the result that it is sometimes difficult to transmit a radar picture properly even though it is clearly visible on the luminescent screen.

An object of the present invention is to provide an improved method of and means for transmitting a radar picture whereby the above-mentioned difficulty is avoided.

A further object of the invention is to provide an improved method of and means for transferring a picture from a luminescent screen or the like to a storage screen.

A still further object of the invention is to provide an improved screen structure for cathode ray tubes.

A still further object of the invention is to provide an improved cathode ray tube having signal put-on and signal take-off sections.

A still further object of the invention is to provide an improved radar system that is designed to record the received radar information.

According to a preferred embodiment of the invention, I provide a double cathode ray tube that comprises a cathode ray receiving tube section or signal put-on section and a cathode ray storage tube section or signal take-off section. A single screen structure is provided for the two tube sections. The screen structure comprises a storage screen that faces the storage tube section and a phosphorescent screen that is in contact with the side of the storage screen facing the receiving tube section. Because the phosphorescent screen and the storage screen are in contact with each other, there is no necessity for a lens system to project or form the phosphorescent screen picture on the storage screen.

The invention will be better understood from the following description taken in connection with the accompanying drawing in which Figure 1 is a block and circuit diagram of the invention as applied to a radar system, Figure 2 is an enlarged view in cross section of the screen used in the cathode ray tube shown in Fig. 1 of the drawing, Figure 3 is a view in cross section of another embodiment of a screen that may be used in the cathode ray tube of Fig. 1, and Figure 4 is a view of the screen of Fig. 1 separated into two portions for the purpose of illustrating the scanning paths of the cathode rays in the cathode ray tube of Fig. 1.

Fig. 1 shows a pulse-echo radar system comprising a radio transmitter 10 that is pulse modulated by pulses supplied from a pulse generator 11 through a delay network 12 and a pulse keyer or modulator 13. The transmitter antenna 15 may be non-directive. Pulses from generator 11 are also supplied over a conductor 14 to a sawtooth wave generator 16. The purpose of the delay network 12 is to insure that any irregularity at the start of the sawtooth wave will have ended by the time a reflected pulse is received.

The particular radar system illustrated is designed to locate and record reflecting objects located to the left and to the right of the radar system. For example, the apparatus illustrated may be carried by an aircraft and used for locating ships at sea. The receiving apparatus comprises directive antennas 17 and 18 pointing to the left and right, respectively, of the aircraft's line of flight. Reflected pulses picked up by the antennas 17 and 18 are supplied to separate radio receivers 19 and 21, respectively, which detect and amplify the received signals.

The video frequency pulses appearing in the receiver output circuits are supplied through blocking capacitors 22 and 23 to the control grids 24 and 26, respectively, of a double gun section of a cathode ray tube 27.

The cathode ray tube 27 comprises two sections, one section being the above-mentioned double gun section which produces two cathode rays which are directed against a luminescent screen such as a phosphorescent screen surface 28, and the other section being a storage tube section having one electron gun that directs a cathode ray against a storage screen surface 29. The double gun section is the signal put-on section and the storage tube section is the signal take-off section.

The double gun section of the tube 27 includes one electron gun that consists of a cathode 31, the grid 24, and first and second anodes 32 and 33, respectively, for producing an electron beam indicated at 30. This section also includes a second electron gun that consists of a cathode 34, the grid 26, and first and second anodes 36 and 37, respectively, for producing an electron beam indicated at 35. The second anodes 33 and 37 are connected to a conductive envelope coating 38 which is grounded. Suitable operating voltages for the cathodes and first anodes are indicated merely by way of example.

Vertical deflecting plates 41 and horizontal deflecting plates 42 are provided for deflecting the electron beam 30. Likewise, vertical deflecting plates 43 and horizontal deflecting plates 44 are provided for deflecting the electron beam 35.

A high frequency sine wave oscillator 46 supplies deflecting voltage to the vertical deflecting plates 41 and 43 so that the electron beams 30 and 35 will make a comparatively wide spot or bar of light on the screen 28 when reflected pulses are received.

The sawtooth voltage wave from the generator 16 is supplied to the horizontal deflecting plates 42 and 44 so that the electron beams 30 and 35 are deflected along a time axis which may be calibrated in terms of distance to the reflecting objects.

Fig. 4 illustrates the appearance of a radar picture on the screen 28. In this instance, the spots or bars A and B represent two ships or other reflecting objects to the right of the airborne radar equipment while the spot C represents a ship to the left of said radar equipment. By means of the storage tube section of the tube 27, the spots A, B and C are recorded on the tape 47 of a facsimile recorder 48 as described hereinafter.

The storage tube section of the tube 27 is similar to the Orthicon employed for television pickup. A low velocity electron beam 49 is produced and directed against the storage screen 29 by means of a cathode 51, a control grid 52, a disc electrode 53, a signal output electrode 54 and a decelerating ring electrode 55. The beam 49 is focused by means of a focusing coil 56 and aligned by means of an alignment coil 57. The beam may be deflected vertically and horizontally by means of deflecting coils that comprise a deflecting yoke 58.

The screens 28 and 29 are opposite surfaces of a single screen structure as shown more clearly in Fig. 2. The storage screen proper consists of photoelectric storage elements 29a supported by a sheet of mica or thin glass 29b. On the other side of the sheet 29b there is a transparent or semi-transparent metal film or coating 29c which, as shown in Fig. 1, preferably is connected to ground.

In the example shown in Fig. 2, the phosphorescent material 28a is coated on a supporting sheet of mica or thin glass 28b, and the supporting sheet 28b is mounted in contact with the conducting film 29c. In the drawing, the thickness of the several supporting sheets and of the coatings of the composite screen 28—29 has been greatly exaggerated for clearness of illustration.

Fig. 3 shows another construction of the screen 28—29 that may be employed if desired. This construction is the same as in Fig. 2 except that the supporting sheet 28b is omitted and the phosphorescent material 28a is coated directly on the transparent conducting layer 29c.

It will be apparent that by closely spacing the phosphorescent screen 28 and the storage screen 29 as illustrated, the image or picture on the screen 28 is transferred to and stored on the screen 29 without the use of a lens system and, therefore, without the large loss of light introduced by a lens system. It may be noted that the phosphorescent screen 28 might be replaced, for example, by a screen of the type that has an image formed thereon by the heating effect of the bombarding electrons of the scanning beam. Such an image could be either a visible image or an invisible image such as an infrared ray image.

Referring again to Fig. 1, suitable voltages for the electrodes of the storage tube section have been indicated merely by way of example. A horizontal scanning current of triangular wave form is supplied to the deflecting yoke 58 from any suitable source such as the rotating arm 61 of a potentiometer resistor 62 that is supplied with current from a battery 63. The potentiometer arm 61 is driven by a motor 64 in synchronism with the scanning drum 66 of the recorder 48.

A vertical deflecting current for shifting the electron beam 49 up and down is supplied to the deflecting yoke 58 from a battery 67 by way of a cam operated switch 68. The cam 69 for operating the switch 68 is driven in synchronism with the potentiometer arm 61 as indicated by the broken line 71. Preferably, a high frequency sine wave current is also supplied from an oscillator 72 to the deflecting yoke for widening the line along which the cathode ray 49 scans.

The method of taking the stored signal off the storage screen 29 by the scanning beam 49 is the same as that previously employed in the Orthicon. As indicated by the broken line 75, as the beam 49 scans the screen 29 there is a return beam of electrons that strikes the disc electrode 53. As a result, secondary electrons are released from the disc 53 and these electrons are collected by the signal output electrode 54 with a resulting signal current flow through an output resistor 73. Signal output voltage is supplied from the resistor 73 over a conductor 74 to a direct-current amplifier 76 which supplies amplified signal to the recorder 48.

Fig. 4 indicates the rectangular scanning path that the scanning beam 49 traces on the storage screen 29 as a result of the horizontal and vertical scanning currents supplied to the deflecting yoke 58. This scanning sequence causes the spots A, B and C of the radar picture to be recorded on the facsimile tape 47 in the manner shown in Fig. 1a.

The take-off section of the cathode ray tube may be of the Image Orthicon type, if desired. In that case the luminescent screen coating is on the back side of the photocathode so that an image on the luminescent screen releases electrons from the photocathode. These released electrons are imaged on a two-sided target glass which functions as a storage screen. A target screen is positioned adjacent to the target glass on the photocathode side. Image Orthicon structure of this type is described in application Serial No. 631,441, now Patent No. 2,506,741, issued May 9, 1950, filed November 28, 1945, in the name of Albert Rose, and entitled Television Transmitting Tube, which is a continuation-in-part of application Serial No. 357,543, filed September 20, 1940, in the name of Albert Rose, and entitled Television Transmitting Tube and Method of Electrode Manufacture, which was abandoned June 18, 1946.

By employing two receivers in the manner described in the foregoing pages the use of antenna switching is avoided and, as a result, there is no need for any synchronizing of antenna switching and cathode ray tube deflection. Furthermore, the information as to objects both to the right and to the left is being supplied to the cathode ray tube the entire time instead of somewhat less than half the time as in the case where the antenna is switched. As a result there is substantially less chance of failure to record an object.

I claim as my invention:

1. A cathode ray tube comprising a put-on section and a take-off section, a screen structure common to said two sections which has a luminescent screen surface facing said put-on section and a storage screen surface facing said take-off section, an electron gun in said put-on section for directing an electron beam against said luminescent screen surface, in operation said electron beam forming an image on said luminescent screen which is stored on said storage screen, means comprising an electron gun in said take-off section for taking said storage image off said storage screen in the form of an output signal, said screen structure further comprising a transparent conducting film positioned between said luminescent screen surface and said storage screen surface.

2. A cathode ray tube comprising a put-on section and a take-off section, a screen structure common to said two sections which has a luminescent screen surface facing said put-on section and a storage screen surface facing said take-off section, an electron gun in said put-on section for directing an electron beam against said luminescent screen surface, said electron gun including a first anode and a second anode, in operation said electron beam forming an image on said luminescent screen which is stored on said storage screen, means comprising an electron gun in said take-off section for taking said storage image off said storage screen in the form of an output signal, said screen structure further comprising a transparent conducting film positioned between said luminescent screen surface and said storage screen surface, in the operation of said tube said conducting film being held at a fixed potential that is at least as high as the potential of the second anode of the electron gun in said put-on section.

3. A cathode ray tube comprising a put-on section and a take-off section, a screen structure common to said two sections which has a luminescent screen surface facing said put-on section and a storage screen surface facing said take-off section, an electron gun in said put-on section for directing an electron beam against said luminescent screen surface, said electron gun including a first anode and a second anode, in operation said electron beam forming an image on said luminescent screen which is stored on said storage screen, means comprising an electron gun in said take-off section for producing a low velocity electron beam for taking said storage image off said storage screen in the form of an output signal, the velocity of the electrons in said low velocity beam being so low at the time they strike the storage screen that the ratio of primary electrons to secondary electrons released is greater than unity, said screen structure further comprising a transparent conducting film positioned between said luminescent screen surface and said storage screen surface, in the operation of said tube said conducting film being held at a fixed potential that is at least as high as the potential of the second anode of the electron gun in said put-on section.

DAVID W. EPSTEIN.

REFERENCES CITED

The following references are of record in the file of this patent:

UNITED STATES PATENTS

| Number | Name | Date |
| --- | --- | --- |
| 2,195,489 | Iams | Apr. 2, 1940 |
| 2,213,173 | Rose | Aug. 27, 1940 |
| 2,250,721 | Moller | July 29, 1941 |
| 2,293,899 | Hanson | Aug. 25, 1942 |
| 2,403,562 | Smith | July 9, 1946 |
| 2,403,622 | Tuska | July 9, 1946 |
| 2,409,462 | Zworykin et al. | Oct. 15, 1946 |
| 2,415,981 | Wolff | Feb. 18, 1947 |
| 2,419,239 | White | Apr. 22, 1947 |
| 2,422,295 | Eaton | June 17, 1947 |
| 2,426,218 | Hopgood | Aug. 26, 1947 |
| 2,427,220 | Luck | Sept. 9, 1947 |